Jan. 21, 1964 G. F. CAMP 3,118,389
CONTAMINANT BARRIER FOR RECIPROCATING PUMPS
Filed Aug. 31, 1960 3 Sheets-Sheet 2

INVENTOR.
GEORGE F. CAMP
BY
*Paul H. Johnson*
ATTORNEY

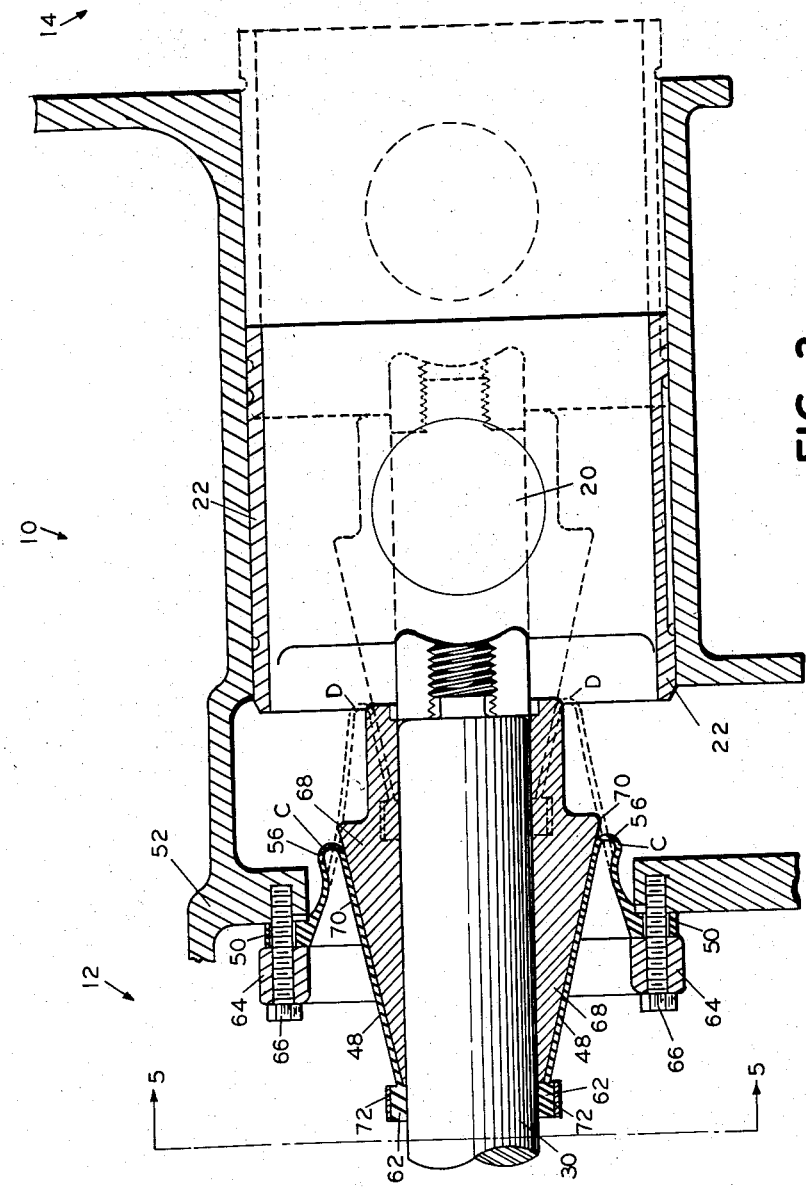

United States Patent Office 3,118,389
Patented Jan. 21, 1964

3,118,389
CONTAMINANT BARRIER FOR RECIPROCATING PUMPS
George F. Camp, Tulsa, Okla., assignor to Frank Wheatley Pump & Valve Manufacturer, Tulsa, Okla., a corporation of Oklahoma
Filed Aug. 31, 1960, Ser. No. 53,084
2 Claims. (Cl. 103—202)

This invention relates to a contaminant barrier for use with a reciprocating pump. More particularly the invention may be described as a diaphragm method of separating the fluid end from the power end of a reciprocating pump whereby contamination of the power end from overflow and leakage of fluid at the fluid end of the pump is prevented.

Most high pressure reciprocating pumps, especially those as used in the oil industry, are composed of two basic sections. The first section may be described as the fluid end, which includes cylinders, plungers, inlet and outlet valves and so forth. All of the mechanisms of the pump which engage the fluid being pumped is contained in the fluid end. The second section of the pump is the power end which includes a crank shaft, connecting rods, crossheads, connecting rod bearings, and so forth. The equipment required to convert rotary energy from the prime mover to reciprocating energy is found in the power end of the pump. A pump rod extends from the power end of the pump to the fluid end. According to present day practice, a wiper box is positioned around the pump rod, thereby separating the fluid end from the power end of the pump. The wiper box contains wiper packing closely formed around the piston rod. The function of the wiper box with its packing is to prevent any fluid passage from the fluid end of the pump into the power end.

Many types of fluid, especially those pumped in the petroleum and chemical industries, are corrosive. For this reason it is imperative that these fluids be kept from contaminating the lubricating oil found in the power end portion of the pump. As an example, one fluid which is frequently pumped in the oil industry is salt water. This fluid is usually pumped under high pressures necessary to force the salt water into the subterranean structures as a means of disposition and simultaneously to provide a water drive to improve oil production. Salt water is a particularly corrosive liquid. If a small quantity of salt water enters the power end of the pump, it can be severely damage the crank shaft main bearings, the connecting rods, bearings and other elements and may utilimately result in a complete failure of the pump. The function of the wiper box is therefore very critical.

When space is not at a premium in the design of pumps, that is, when there is no limitation on the distance between the power and fluid portions, wiper boxes may be designed having sufficient length and providing sufficient packing to engage the pump rod so that a reasonable expectation of success in preventing leakage of fluid from the fluid end into the power end of the pump can be expected. If space becomes a premium, however, and if a pump design is required having a minimum length to accomplish a maximum amount of fluid movement, then insufficient length is available along the piston rod to provide sufficient packing within the wiper box to prevent fluid leakage. Attempts to design pumps having the characteristic of improved space usage without sacrificing efficiency has not been successful since it is impossible to provide a wiper box which is secure against possible failure.

It is an object of this invention to overcome the objections enumerated in reciprocating pumps and to provide a contaminant barrier which will not leak.

Another object of this invention is to provide a contaminant barrier between the fluid and power ends of a reciprocating pump which will prevent the passage of fluid from one end of the pump to the other and which will not require periodic tightening.

Another object of this invention is to provide a contaminant barrier means between the fluid end and power end of a reciprocating pump which will not require lubrication.

Another object of this invention is to provide a contaminant barrier means between the power end and fluid end of the reciprocating pump which will require a minimum of space and which will therefore facilitate the design of a pump of more compact size.

Another object of this invention is to provide a contaminant barrier means between the fluid end and power end of a reciprocating pump which is economical, easy to maintain and which will have a longer service life than other means now known.

These and other objects and a better understanding of the invention may be had by referring to the following description and claims taken in conjunction with the drawings in which:

FIGURE 3 is a fragmentary cross-sectional view of a portion of the pump of FIGURE 1, showing the preferred embodiment of the invention when applied to a pump having a relatively longer stroke length.

Figure 1:
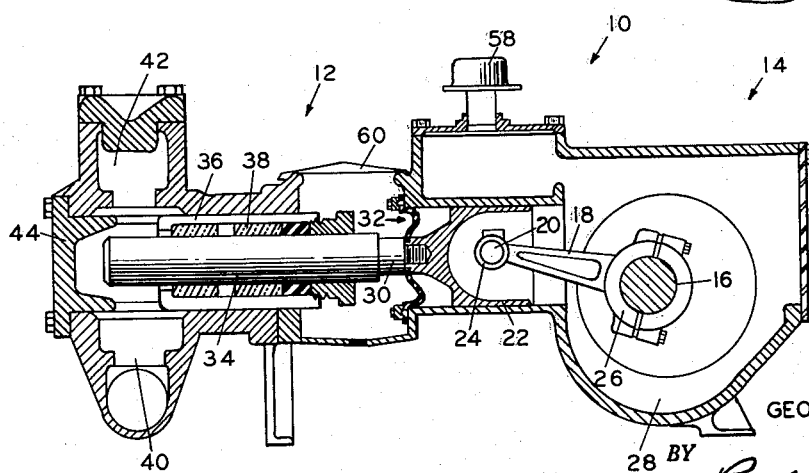
FIGURE 1 is a cross-sectional view of a typical reciprocating type pump, showing the contaminant barrier device of this invention.

Referring now to the drawings and first to FIGURE 1, a cross-section of typical reciprocating pump, indicated generally by numeral 10, is shown. The pump may be broadly divided into two main portions, the fluid end portion, indicated generally by the numeral 12, and the power end portion, indicated generally by the numeral 14. The power end portion 14 contains such items as a crank shaft 16, connecting rods 18, crosshead wrist pin 20, crosshead 22, connecting rod bushings 24, connecting rod bearings 26 and crank shaft main bearings (not shown). In addition, the power end portion 14 includes an oil reservoir area 28 wherein oil necessary to lubricate connecting rod bearings 26, connecting rod bushings 24, and crosshead 22, and other parts, is stored.

Affixed to crosshead 22 is a piston rod 30 which extends through a contaminant barrier 32 to engage piston 34 in the fluid end 12 of pump 10. The contaminant barrier 32 is the separating point between the fluid end 12 and the power end 14 of pump 10. In addition to piston 34 the fluid end 12 includes a cylinder 36, cylinder packing 38, inlet valves 40, outlet valves 42 and cylinder head 44.

The operation of the typical reciprocating pump of FIGURE 1 may be basically described as follows: Power from a rotary energy source (not shown) is applied to rotate crank shaft 16 which transmits oscillatory energy by way of connecting rod 18 to crosshead 22. Piston rod 30 transmits the reciprocating energy from crosshead 22 to piston 34. On the intake stroke, as piston 34 is being withdrawn toward crank shaft 16, inlet valve 40 opens, drawing liquid or gas, according to the medium being pumped, into chamber of cylinder 36. On the power stroke, as piston 34 moves toward cylinder head 44, the inlet valve 40 closes and liquid or gas contained in cylinder 36 is expelled through outlet valve 42.

The bearing points in power end 14 must be properly lubricated with a fine quality uncontaminated lubricant to afford maximum life of the pump. If any contamination of the oil in oil reservoir 28 occurs the effective life of the pump will be reduced. Contamination may result from gritting solids or corrosive liquids or gases entering the oil reservoir 28.

Cylinder packing 38 in the fluid end of the pump 10 is designed to permit piston 34 to pump fluids under high pressures with a minimum of leakage. Efficient operation of pump 10 requires that the friction existing between piston 34 and packing 38 be maintained to a minimum. Minimum friction requires minimum packing pressure which means that when high fluid pressures are being pumped some leakage will inevitably occur between packing 38 and piston 34. If packing 38 is placed under sufficient compression to absolutely prevent any fluid leakage past piston 34 then the friction on piston 34 will become so extensive as to drastically reduce over all pumping efficiency.

Even if packing 38 is initially adjusted to prevent any fluid leakage past piston 34, running of the pump for a certain length of time will wear packing 38 sufficiently so that some small leakage of fluid between piston 34 and cylinder 36 is virtually impossible to prevent when pump 10 is used for high pressure applications.

To absolutely insure that no leakage at all will occur between piston 34 and cylinder 36 the tension on packing 38 would have to be frequently adjusted during pump usage. Thus it can be seen that even under ideal circumstances, a certain small amount of leakage will normally occur between piston 34 and cylinder 36. When the pump 10 is used for pumping particularly corrosive fluids, such as salt water, it is vitally important that none of the fluid leak from the piston 34 back into the power end 14 of the pump. When leakage does occur between cylinder 36 and piston 34, there is a natural tendency for the escaped liquid to run along piston rod 30 back toward the crosshead 22. To prevent fluid leakage from the fluid end 12 into the power end 14, a contaminant barrier 32 is provided. Up to the present time, the contaminant barrier 32 universally has been one form or another of a wiper box (not shown) having wiper box packing therein disposed to fit around piston rod 30 in the same manner that packing 38 fits around piston 34.

The type of contaminant barrier utilizing packing is subject to the same problems that exist as far as cylinder packing 38 is concerned. That is, if sufficient compression is placed on the wiper box packing to assure that absolutely no contaminant will pass into the power end 14 high friction loss occurs on the piston rod 30. The same situation exists as to wear, in that after the pump 10 runs for a certain length of time, wear will occur in wiper box packing so that to prevent leakage it is frequently necessary to adjust the compression on the wiper box packing.

The wiper box contaminant barrier has been a weak point in pump construction for many years. Frequent cases of failure may be traced to defective or poorly maintained wiper box packing which permits contaminants to enter the lubrication system of the power end 14 of the pump 10. The principles of this invention make possible an absolutely sealed contaminant barrier 32 of a type which does not require packing and which therefore does not require constant attention as to the compression placed on the packing.

Figure 2:
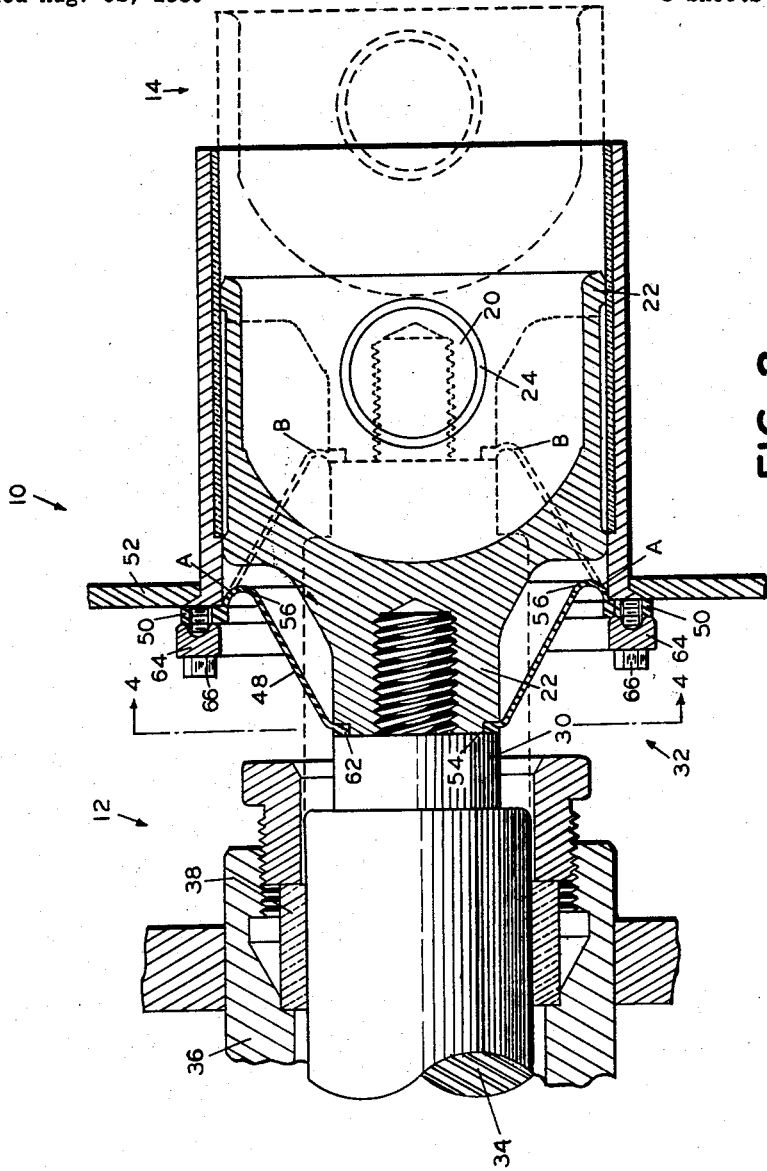
FIGURE 2 is a fragmentary cross-sectional portion of the contaminant barrier device of the invention, showing the preferred embodiment of the invention when applied to a pump having a relatively short stroke.

Referring now to FIGURE 2, piston 34 is connected with a relatively short piston rod 30 to crosshead 22. Positioned between fluid end 12 and power end 14 is a diaphragm 48 which, under the principles of this invention, replaces the wiper box presently used in reciprocating type pumps. Diaphragm 48 is supported at its outer periphery 50 to frame 52 of pump 10. Diaphragm 48 has an opening 54 therein adaptable to receive piston rod 30. Inner periphery 62 forms the circumference of opening 54 and is supported to piston rod 30 at the juncture of piston rod 30 and crosshead 22. The inner periphery 62 and outer periphery 50 are firmly supported in leak proof engagement with the components of the pump so that fluid passage between the fluid end 12 and power end 14 of the pump 10 is prevented.

Diaphragm 48 is composed of a flexible material permitting piston rod 30 and crosshead 22 to oscillate back and forth as the pump functions, at all times forming a complete barrier against passage of liquid, gas, dirt or any other type of contamination from one compartment to the other. Diaphragm 48 does not rely on a frictional contact to seal against fluid passage and therefore absorbs almost no energy from the pump. Since no frictional wear occurs in diaphragm 48, it is not necessary to make periodic packing adjustments. This means that less maintenance is required and fewer hours of down-time of the pump will be occasioned with use of the diaphragm 48 of this invention.

FIGURE 2 shows in solid lines the position of piston rod 30 and diaphragm 48 when the pump is moved in the maximum forward direction and in dotted lines the position of these elements when the pump is in its maximum rearward position. When the pump is in the maximum forward position the greatest angle of fold occurs near the exterior circumference of crosshead 22 at a point indicated by the letters "A." As piston 30 and crosshead 22 travel rearward in the direction toward the crank shaft (not shown in FIGURE 2) the fold of diaphragm 48 occurs near the inner periphery 62, at a point indicated by the letters "B." The fold, indicated by numeral 56, of diaphragm 48 moves gradually from points "A" to points "B" and back again to points "A" on each complete cycle of the pumping stroke. In this arrangement, the fold 56 is at different positions during the stroke cycle and occurs at different points along the full length of diaphragm 48 which means that flexing of the diaphragm occurs evenly over the full area of the diaphragm and that no particular point receives continuous flexing relative to other points. This provision assures service life of the diaphragm of increased duration compared to arrangements wherein folding occurs at one point only.

The fold 56, shown in cross-section in FIGURE 2, occurs symmetrically about the axis of piston rod 30 and moves outward in an expanding diameter as piston rod 30 moves in the direction of the crank shaft of the pump 10, reaching a maximum diameter at the rearward most position of piston rod 30. As the piston rod reverses its direction and moves toward the fluid end 12, the fold 56 has a diminishing diameter and reaches its minimum diameter when piston rod 30 is in its maximum forward position.

The provision of a diaphragm 48 separating the fluid end 12 from the power end 14 of a reciprocating pump forms an impassible barrier against the contamination of the power end 14 with fluid leakages. The diaphragm 48 is not a pressure type seal and in normal reciprocating pump construction there will ordinarily be no pressure on either side of the diaphragm seal. The power end 14, although forming a closed volume, is subject to atmospheric pressure by the provision of a breather 58 (see FIGURE 1). The area between the diaphragm 48 and cylinder 36 is likewise maintained at atmospheric pressure since only a loose fitting dust cover 60 is placed over this section of the pump to prevent the entrance of dirt and other contaminants into the pump. Diaphragm 48 is not intended primarily as a pressure type contaminant barrier, however, if the diaphragm is constructed of a thicker, tougher material, then the novel device of this invention would make possible its utilization in pressure applications.

Figure 4:
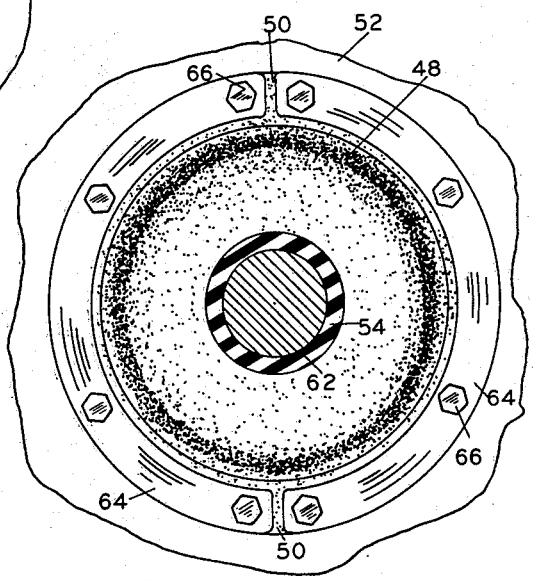
FIGURE 4 is an end view of the contaminant barrier of this invention taken along the line 4—4 of FIGURE 2.

Diaphragm 48 has an integrally formed inner periphery 62 of a thickened cross-section. Compression of the inner periphery 62 between piston rod 30 and crosshead 22 retains the inner periphery 62 in contact with piston rod 30. Diaphragm 48 also contains in integrally formed outer periphery 50 of a thickened cross-section which engages frame 52 of pump 10. The outer periphery 50 is supported in engagement with frame 52 by semi-circular diaphragm retainer elements 64, best seen in FIGURE 4. Bolts 66 support retainer elements 64 to frame 52. The semi-circular arrangement of retainer elements 64 permits their ready assembly to frame 52.

The diaphragm arrangement of FIGURE 2 is ideally adapted for reciprocating pumps having a relatively short stroke. When the principles of this invention are applied to pumps having much longer strokes, a provision must be made so that fold 56 occurs in a predetermined manner in such a way that the diaphragm 48 will not become knotted and will not develop weak points. To utilize the principles of this invention on reciprocating pumps having longer strokes, the arrangement of FIGURE 3 has proven highly successful.

The components of FIGURE 3 are arranged substantially identically to that of FIGURE 2, with the exception of the additional provision of a fold guide member 68 affixed to piston rod 30. As the pump 10 reciprocates, fold 56 expands in an even circumference inwardly and outwardly. Due to the relatively long stroke of the pump mechanism of FIGURE 3, without the provision of fold guide 68 fold 56 would become uneven and the extended configuration of the diaphragm 48 would become more or less wadded, thereby developing high stress and rapidly wearing points.

Fold guide 68 is of a cylindrical configuration having a cone shaped exterior surface 70. The exterior surface 70 has a linearly expanding diameter from the point adjacent the inner periphery 62 of diaphragm 48 expanding outwardly toward the power end 14 of the pump 10. As the piston rod 30 moves in the direction of the fluid end 12 of the pump fold 56 of diaphragm 48 has an expanding diameter so that the portion of diaphragm 48 existing between inner periphery 62 and fold 56 lies flat against the exterior surface 70 of fold guide 68. This prevents irregular folding of the diaphragm 48 which insures greatly extended service life.

Figure 5:
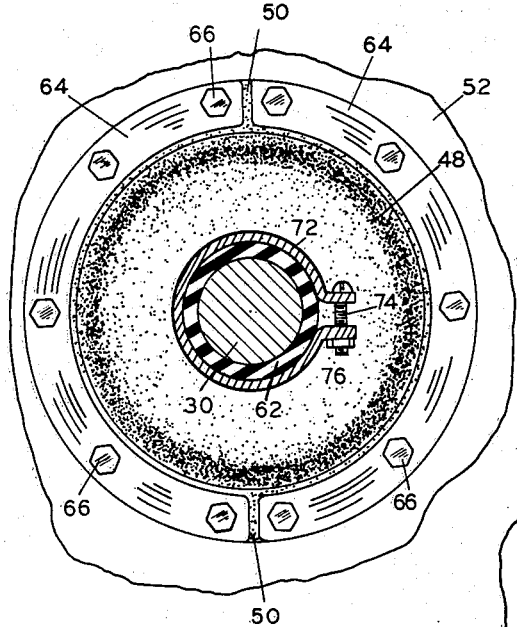
FIGURE 5 is an end view of the contaminant barrier device of this invention taken along the line 5—5 of FIGURE 3.

Retainer element 64 secures the thickened outer periphery 50 of diaphragm 48 to frame 52 in the same manner described for FIGURE 2. The thickened inner periphery 62 may be supported to piston rod 30 in a manner such as using a hose type clamp 72, best shown in FIGURE 5. The means of supporting the inner periphery 62 and outer periphery 50 to the elements of pump 10 are by way of example only and many other methods are apparent.

Diaphragm 48 is shown in solid lines in FIGURE 3 as it would be positioned in substantially the maximum forward stroke of piston rod 30. In this position diaphragm fold 56 appears at points indicated by the letter "C." On the rearward stroke of piston rod 30, fold 56 moves toward the inner periphery 62 and appears at points indicated by the letter "D." As the piston rod 30 reciprocates, fold 56 varies between positions "C" and "D" in a uniform manner so that the wear is evenly distributed over substantially the full length of the diaphragm 48, insuring a greatly extended service life.

The diaphragm type contaminant barrier of this invention makes possible the design of pumps having greatly shortened piston rod 30 since no length is required for the presently used wiper box packing. Very little frictional energy is consumed by the diaphragm 48 compared to wiper boxes. No lubrication or adjusting of diaphragm 48 is required. In short, the principles of this invention provide improvements and advantages hitherto not available in contaminant barrier devices.

Although this invention has been described with a certain degree of particularity it is manifested that many changes may be made in the details of the construction and many alternate arrangements of the components of this invention may be made without departing from the spirit and the scope of this disclosure.

I claim:

1. A contaminant barrier adaptable for sealing the power end portion of a reciprocating pump having a housing and a piston rod reciprocated in said housing comprising, a flexible folded diaphragm having an opening therein bounded by an inner periphery, said diaphragm having an outer periphery, said outer periphery supported to said housing and said inner periphery receiving and supported to said piston rod, said diaphragm having a fold therein disposed between said inner periphery and said outer periphery; a fold guide, said fold guide having an opening therein adaptable for receiving said piston rod, said fold guide having truncated cone shaped exterior configuration whereby the smallest exterior diameter of said fold guide is positioned adjacent said inner diaphragm periphery affixed to said piston rod, the diameter of said fold guide expanding in the direction of said fold in said diaphragm wherein the portion of said diaphragm between said inner periphery and said fold is in contact with a portion of the exterior surface of said fold guide and wherein the position said fold guide engages the exterior surface of said fold guide changes continually from the maximum forward to the maximum rearward position of said piston rod relative to said pump housing, and means of supporting said fold guide to said piston rod.

2. A contaminant barrier adaptable for sealing the power end portion of a reciprocating pump from the fluid end portion of said reciprocating pump, said reciprocating pump having a housing and a piston rod reciprocated within said housing comprising, a flexible diaphragm having an opening therein adaptable for receiving said piston rod, said opening bounded by an integrally formed inner periphery of a thickness greater than the thickness of said diaphragm, said diaphragm having an integrally formed outer periphery of a thickness greater than the thickness of said diaphragm, and said diaphragm having a fold therein disposed between said inner periphery and said outer periphery; a fold guide, said fold guide having an opening therein adaptable for receiving said piston rod, said fold guide having a truncated, cone shaped exterior configuration whereby the smallest exterior diameter of said fold guide is positioned adjacent said inner periphery affixed to said piston rod, the diameter of said fold guide expanding in the direction of said fold in said diaphragm wherein the portion of said diaphragm between said inner periphery and said fold is in contact with a portion of the exterior surface of said fold guide and wherein the position said fold engages the exterior surface of said fold guide changes continually from the maximum forward to the maximum rearward position of said piston rod relative to said pump housing; means of supporting said diaphragm inner periphery to said piston rod; means of supporting said diaphragm outer periphery to said housing; and means of supporting said fold guide to said piston rod.

References Cited in the file of this patent

UNITED STATES PATENTS

| | | |
|---|---|---|
| 166,611 | Hyde | Aug. 10, 1875 |
| 278,597 | Prier et al. | May 29, 1883 |
| 1,756,712 | Vaughan et al. | Apr. 29, 1930 |
| 1,977,075 | Magnuson | Oct. 16, 1934 |
| 2,178,953 | Chilton | Nov. 7, 1939 |
| 2,219,566 | Sauzedde | Oct. 29, 1940 |
| 2,322,010 | Fowler | June 15, 1943 |
| 2,326,474 | Malsbary et al. | Aug. 10, 1943 |
| 2,402,524 | Corydon | June 18, 1946 |
| 2,711,137 | Moller | June 21, 1955 |
| 2,842,971 | Cornell | July 15, 1958 |